United States Patent
Kumazawa et al.

(10) Patent No.: US 11,185,947 B2
(45) Date of Patent: Nov. 30, 2021

(54) WELDING STRUCTURE AND WELDING METHOD FOR METAL MEMBER

(71) Applicant: Panasonic Intellectual Property Management Co., Ltd., Osaka (JP)

(72) Inventors: Seiji Kumazawa, Nara (JP); Takayuki Ashida, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 455 days.

(21) Appl. No.: 16/318,959

(22) PCT Filed: Jun. 21, 2018

(86) PCT No.: PCT/JP2018/023566
§ 371 (c)(1),
(2) Date: Jan. 18, 2019

(87) PCT Pub. No.: WO2019/087455
PCT Pub. Date: May 9, 2019

(65) Prior Publication Data
US 2020/0009685 A1  Jan. 9, 2020

(30) Foreign Application Priority Data
Oct. 30, 2017 (JP) .............................. JP2017-209258

(51) Int. Cl.
*B23K 26/00* (2014.01)
*B23K 26/22* (2006.01)
(Continued)

(52) U.S. Cl.
CPC ........... *B23K 26/24* (2013.01); *H01M 50/528* (2021.01)

(58) Field of Classification Search
CPC .............. B23K 2103/10; B23K 26/323; B23K 2103/12
See application file for complete search history.

(56) References Cited

U.S. PATENT DOCUMENTS 6,163,011 A * 12/2000 Urushizaki ........ F02M 51/0671
219/121.64
9,761,855 B2 * 9/2017 Tsutsumi ............ H01M 50/502
(Continued)

FOREIGN PATENT DOCUMENTS

CN       101018641 A     8/2007
JP       11-239888       9/1999
(Continued)

OTHER PUBLICATIONS

The Extended European Search Report dated Nov. 16, 2020, for the related European Patent Application No. 18829713.9.
(Continued)

*Primary Examiner* — Robert J Utama
*Assistant Examiner* — Lawrence H Samuels
(74) *Attorney, Agent, or Firm* — McDermott Will and Emery LLP

(57) ABSTRACT

A welding structure for a metal member includes a first member containing a metal member, a second member containing a metal member, a first solidifying portion, a second solidifying portion, and a third solidifying portion. The first solidifying portion is present from a first surface to a second surface of the first member. The second solidifying portion has a first end that is present in the second member and a second end that is connected to the first solidifying portion. The third solidifying portion has a first end that is present in the second member and a second end that is connected to the first solidifying portion. The third solidifying portion is shorter than the second solidifying portion.

(Continued)

The second solidifying portion and the third solidifying portion are separated from each other in the second member.

10 Claims, 9 Drawing Sheets

(51) Int. Cl.
  *B23K 26/24* (2014.01)
  *H01M 50/528* (2021.01)

(56) References Cited

U.S. PATENT DOCUMENTS

| | | | | |
|---|---|---|---|---|
| 10,449,698 | B2* | 10/2019 | Nishikawa | B29C 66/7394 |
| 2009/0223940 | A1* | 9/2009 | Hosoya | B23K 15/0093 |
| | | | | 219/121.64 |
| 2014/0377625 | A1* | 12/2014 | Tsutsumi | H01M 50/502 |
| | | | | 429/121 |
| 2015/0145241 | A1* | 5/2015 | Asami | B23K 26/70 |
| | | | | 285/288.1 |
| 2017/0259468 | A1* | 9/2017 | Nishikawa | B29C 45/14 |
| 2018/0045232 | A1* | 2/2018 | Capostagno | F16B 5/08 |
| 2018/0245616 | A1 | 8/2018 | Kumazawa et al. | |
| 2020/0141434 | A1* | 5/2020 | Sugimura | B23K 26/323 |

FOREIGN PATENT DOCUMENTS

| | | |
|---|---|---|
| WO | 2006/016441 | 2/2006 |
| WO | 2016/128704 A2 | 8/2016 |
| WO | 2017/047050 | 3/2017 |

OTHER PUBLICATIONS

International Search Report of PCT application No. PCT/JP2018/023566 dated Aug. 28, 2018.
English Translation of Chinese Search Report dated Jun. 30, 2020 for the related Chinese Patent Application No. 201880002868.1.

* cited by examiner

WELDING STRUCTURE AND WELDING METHOD FOR METAL MEMBER

CROSS-REFERENCE TO RELATED APPLICATIONS

This application is a U.S. national stage application of the PCT International Application No. PCT/JP2018/023566 filed on Jun. 21, 2018, which claims the benefit of foreign priority of Japanese patent application 2017-209258 filed on Oct. 30, 2017, the contents all of which are incorporated herein by reference.

TECHNICAL FIELD

This disclosure relates to a welding structure and a welding method for a metal member obtained by overlapping and welding a first member on a second member.

BACKGROUND ART

A battery system is configured to have a plurality of battery cells which are connected to each other with a busbar of a metal plate. The busbar is laser-welded to be connected to electrode terminals of the battery cells that configure the battery system. In a connection structure, the busbar is disposed on flat parts of the electrode terminals of the battery cells, and irradiation with a laser beam is performed from a side of a front surface of the busbar such that both of the electrode terminals and the busbar are melted to be connected to each other.

A battery has a positive electrode and a negative electrode. In general, an aluminum terminal is used on the positive electrode side, and a nickel-plated copper terminal is used on the negative electrode side. Since, the busbar connects adjacent battery cells to each other in series or parallel, electrode terminals of at least two battery cells are connected to one busbar.

In a case where a bonded member of aluminum and copper which are referred to as clad materials is used for the busbar, an aluminum terminal on the positive electrode side may be welded on a side of aluminum of the clad material, and the copper terminal on the negative electrode side may be welded on a side of copper of the clad material. Therefore, the same metals are welded to each other, and thus there is no particular technical difficulty.

However, thin plates of aluminum and copper overlap each other such that bonding portions thereof overlap each other, and pressure is applied while heat is applied such that the clad materials are subjected to pressure bonding. Therefore, processing costs are high, as well as high direct material costs, and thus it is not possible to reduce costs.

In this respect, inexpensive aluminum is used in the busbar, and thereby it is possible to produce an inexpensive and light-weight battery system. However, in a case of using an aluminum busbar, there is no problem in similar metal welding of the aluminum busbar and an aluminum terminal on the positive electrode side; however, dissimilar metal welding of the aluminum busbar and a nickel-plated copper terminal is performed on the negative electrode side, and thus it is very difficult to realize stable and high-quality welding.

The dissimilar metal welding is performed by melting, mixing, and then solidifying different metal materials together. In the dissimilar metal welding of aluminum and copper, when alloys thereof are sufficiently heated to be melted at a certain temperature or above in a certain period of time, an intermetallic compound having a certain composition ratio of aluminum and copper is formed. The intermetallic compound has small lattice defects and forms a very hard layer; however, when stress is applied thereto, the layer becomes brittle to be torn. Therefore, a simple increase in melting volume does not allow a high bonding strength to be obtained, and it is difficult to stably obtain the high bonding strength. In particular, in manufacturing a battery system, it is difficult to dispose the aluminum busbar and the nickel-plated copper terminal without a gap therebetween overall, and it is very difficult to stably realize high-quality welding by which the high bonding strength is always obtained, even when there are gaps to some degree or there are no gaps.

In the dissimilar metal welding, as a measure structure for the strength, welding structure is invented, in which high-hardness layers and low-hardness layers are alternately and repeatedly stacked in a proceeding direction of welding (see PTL 1).

A method disclosed in PTL 1 is shown in sectional views in FIGS. 10A and 10B. FIG. 10B is a sectional view taken along line A-A of FIG. 10A. First member 21 made of ferritic stainless steel or low-carbon steel and second member 22 made of martensitic stainless steel or high-carbon steel are overlapped on each other and a surface of first member 21 is irradiated with a laser beam.

As shown in FIG. 10B, a melting-solidifying portion in a hatched region has a sectional structure having an inverted triangular shape, on a section in a right angle direction to an irradiation direction of the laser beam, of which a width is gradually narrowed from a surface side toward an inside of first member 21.

In addition, the melting-solidifying portion includes low-hardness layer 23 on a surface side thereof and high-hardness layer 24 on an inner side thereof. Also, high-hardness layer 24 has a configuration in which first layers 25 and second layers 26 having a hardness lower than that of the first layer are alternately and repeatedly stacked in a welding proceeding direction.

As a preparation method of such a welding structure, the surface of first member 21 is irradiated with the laser beam in a pulsed manner. First, a first melting portion is formed by melting first member 21 and second member 22 with a laser beam of a first pulse.

Then, at a time when growth of solidification of the first melting portion reaches a half of a movement distance of a laser beam axis, a slight shift of a position is performed such that irradiation is performed with a laser beam of a second pulse. Consequently, a second melting portion is formed to have a part overlapping the first melting portion. Then, similarly, irradiation is sequentially performed with laser beams of third and subsequent pulses at predetermined intervals while being ON/OFF.

As a characteristic of the welding structure, the inverted triangular structure is formed on the section in the right direction to the proceeding direction of the welding as described above (FIG. 10B), and first layers 25 and second layers 26 are repeatedly stacked in the proceeding direction on a section in the proceeding direction (FIG. 10A). First layer 25 and second layer 26 have substantially the same melting depth.

CITATION LIST

Patent Literature

PTL 1: Japanese Patent Unexamined Publication No. 11-239888

SUMMARY

A welding structure for a metal member according to this disclosure includes a first member, a second member, a first solidifying portion, a second solidifying portion, and a third solidifying portion.

The first member has a first surface and a second surface on an opposite side of the first surface, and contains a metal member.

The second member is stacked on the second surface of the first member and contains a metal member.

The first solidifying portion is present from the first surface to the second surface of the first member.

The second solidifying portion has a first end, which is present in the second member, and a second end, which is connected to the first solidifying portion.

The third solidifying portion has a first end, which is present in the second member, and a second end, which is connected to the first solidifying portion.

The third solidifying portion is shorter than the second solidifying portion.

The second solidifying portion and the third solidifying portion are separated from each other in the second member.

In addition, a welding method for a metal member according to this disclosure is a welding method between a first member containing a metal member and a second member containing a metal member.

The first member has a first surface and a second surface on an opposite side of the first surface.

The second member is stacked on the second surface of the first member.

The welding method for a metal member includes first scanning of performing scanning with a first laser beam along a first track, and second scanning of performing scanning with a second laser beam with a higher output or at a lower speed than the first laser beam, along a second track different from the first track.

The first scanning and the second scanning are alternately performed at least once.

The first scanning and the second scanning cause metal of the first member to be melted from the first surface to the second surface of the first member and then solidified such that a first solidifying portion is formed.

When the first solidifying portion is formed, the first scanning causes metal of the second member to be melted and then solidified such that a second solidifying portion is formed to have a first end, which is present in the second member, and a second end, which is connected to the first solidifying portion.

When the first solidifying portion is formed, the second scanning causes metal of the second member to be melted and then solidified such that a third solidifying portion is formed to have a first end, which is present in the second member, and a second end, which is connected to the first solidifying portion.

When the second scanning is performed following the first scanning, the second scanning is performed with the second laser beam along the second track moved by a distance at which melting portions of the second member by the first scanning are separable from each other.

DESCRIPTION OF EMBODIMENTS

However, in a welding structure in the related art disclosed in PTL 1, first layer 25 and second layer 26 have the same welding depth, and thus a gap is likely to be formed due to a variation in a process. In a case where substantially no gap is formed, one layer is melted deep into the other layer, and thereby a melting volume increases. Therefore, a large amount of an intermetallic compound is formed, and thereby a bonding strength decreases. In order to increase the bonding strength, it is necessary to make the welding depth shallow so as to suppress production of the intermetallic compound. However, when the welding depth is shallow, and a gap is formed, the welding depth becomes shallower, and thus the welding strength decreases. Hereinafter, exemplary embodiments will be described with reference to the drawings. For simplification of description, configurational elements having practically the same functions are represented by the same reference marks.

Figure 1A:
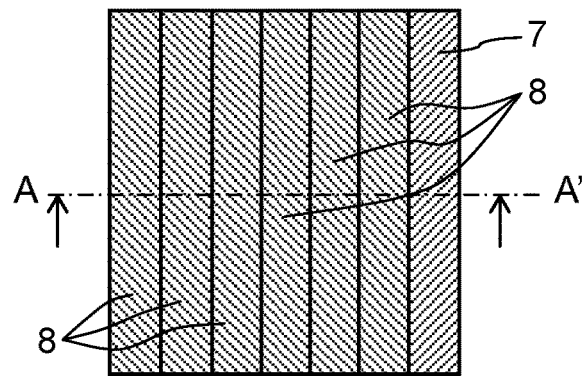
FIG. 1A is a top view showing a laser irradiation pattern of Example 1 in Exemplary Embodiment 1.
Figure 1B:
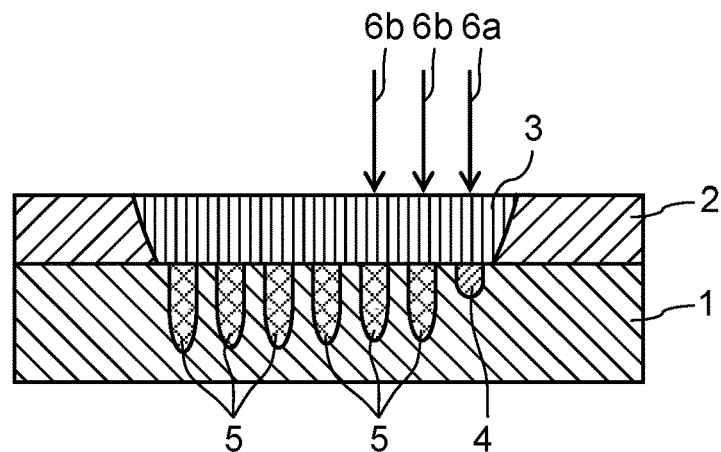
FIG. 1B is a sectional view showing a welding structure in a right angle direction to a scanning direction in a case where no gap is formed in Example 1.

Table 1 shows a relationship between Exemplary Embodiments 1 and 2 and examples corresponding thereto, collectively.

terminal and an aluminum busbar of a cell in Exemplary Embodiment 1. FIG. 1A is a top view of the welding structure body viewed from a side of the aluminum busbar. FIG. 1B is a sectional view taken along line A-A' of FIG. 1A.

A connecting portion of aluminum busbar 2 as an example of the first member is disposed to be overlapped on nickel-plated copper terminal 1 as an example of the second member. In this case, although not shown in FIG. 1B, a gap between aluminum busbar 2 and nickel-plated copper terminal 1 is to be as small as possible by a jig that comes into press contact downward from above in FIG. 1B with a region of a surface of aluminum busbar 2, which is not irradiated with a laser.

Next, as first scanning, while irradiation is performed with first laser beam 6a set to have any output, scanning is performed at any speed along linear track 7 shown in FIG. 1A in a downward direction from above in FIG. 1A, that is, from a back side to a front side in FIG. 1B. Consequently, the vicinity of a portion of aluminum busbar 2, which is irradiated with first laser beam 6a, at a right end in FIG. 1B is melted.

Then, first laser beam 6a travels away from aluminum busbar 2. In this manner, aluminum melted with first laser beam 6a is solidified, and aluminum busbar 2 in a region closer to an interface of nickel-plated copper terminal 1 from the surface of aluminum busbar 2 becomes first solidifying

TABLE 1

Figure 2:
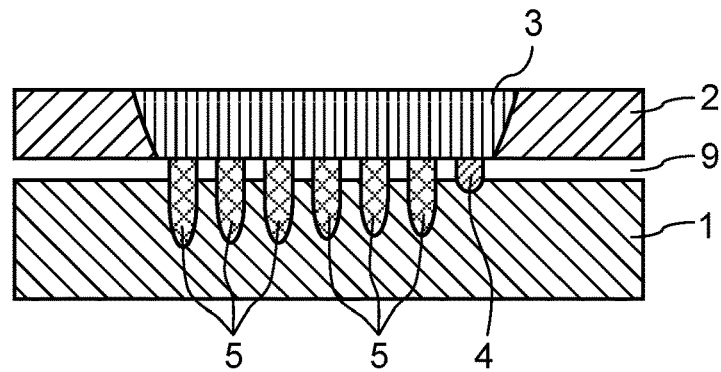
FIG. 2 is a sectional view showing the welding structure in the right angle direction to the scanning direction in a case where a gap is formed in Example 1.
Figure 3A:
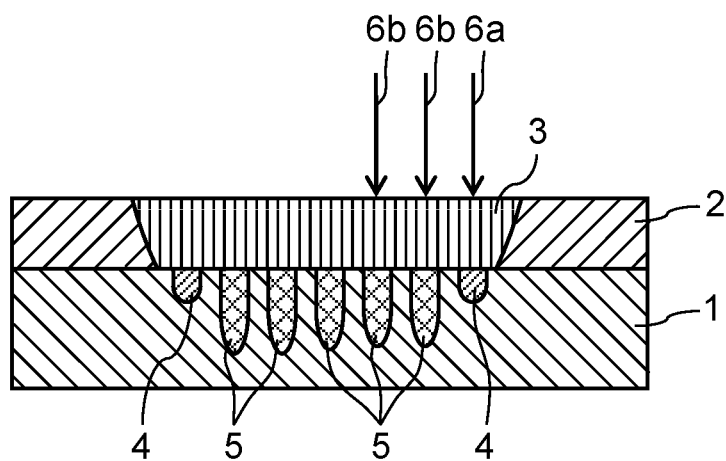
FIG. 3A is a sectional view showing a welding structure in the right angle direction to the scanning direction in a case where no gap is formed in Example 2 in Exemplary Embodiment 1.
Figure 3B:
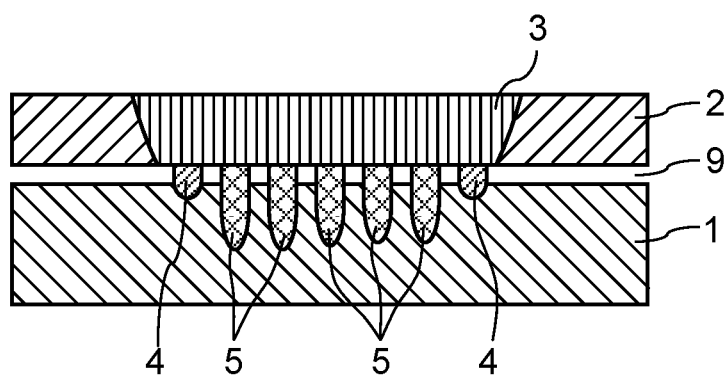
FIG. 3B is a sectional view showing the welding structure in the right angle direction to the scanning direction in a case where a gap is formed in Example 2.
Figure 4A:
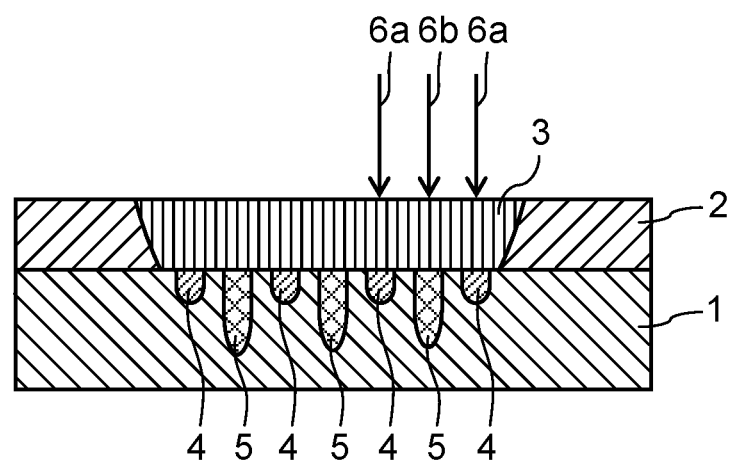
FIG. 4A is a sectional view showing a welding structure in the right angle direction to the scanning direction in a case where no gap is formed in Example 3 in Exemplary Embodiment 1.
Figure 4B:
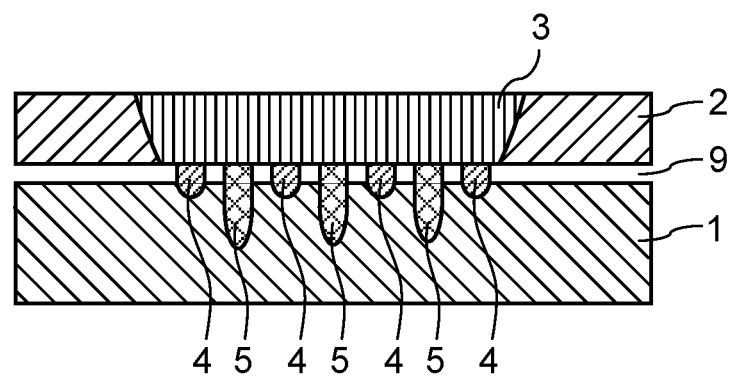
FIG. 4B is a sectional view showing the welding structure in the right angle direction to the scanning direction in a case where a gap is formed in Example 3.
Figure 5A:
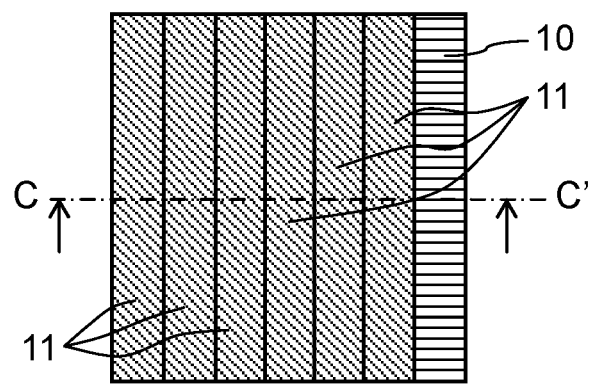
FIG. 5A is a top view showing a laser irradiation pattern of Example 4 in Exemplary Embodiment 2.
Figure 5B:
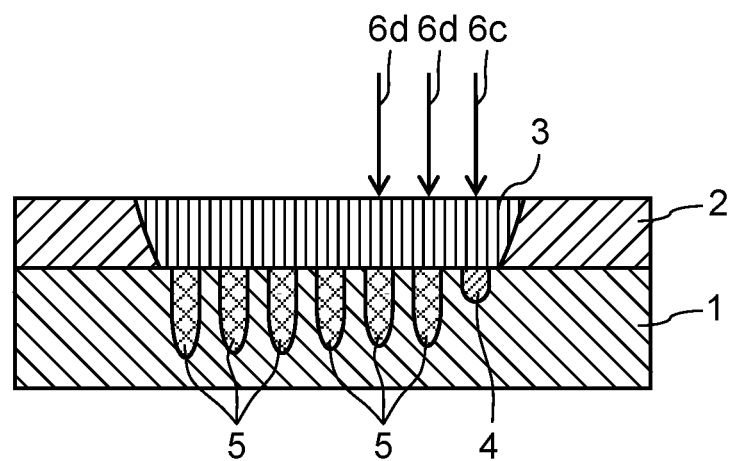
FIG. 5B is a sectional view showing a welding structure in the right angle direction to the scanning direction in a case where no gap is formed in Example 4.
Figure 5C:
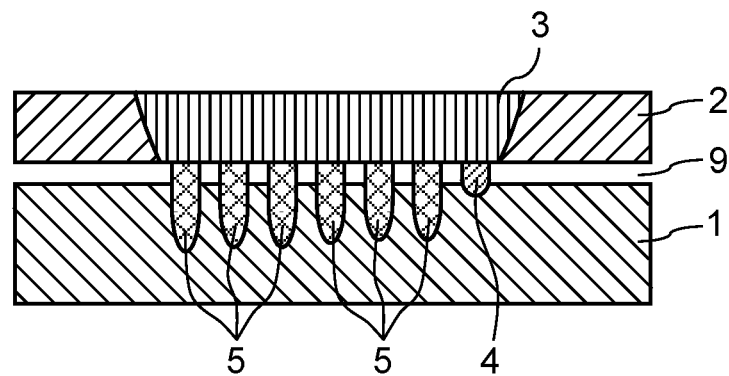
FIG. 5C is a sectional view showing the welding structure in the right angle direction to the scanning direction in a case where a gap is formed in Example 4.
Figure 6A:
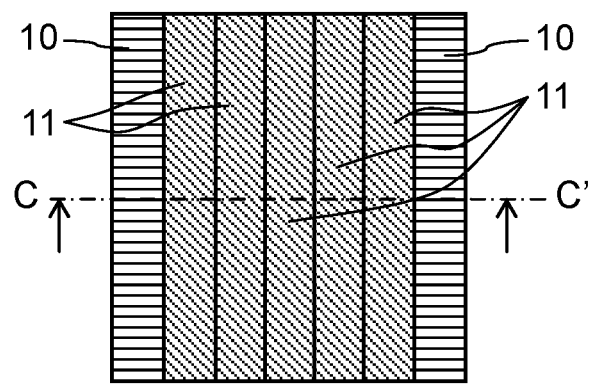
FIG. 6A is a top view showing a laser irradiation pattern of Example 5 in Exemplary Embodiment 2.
Figure 6B:
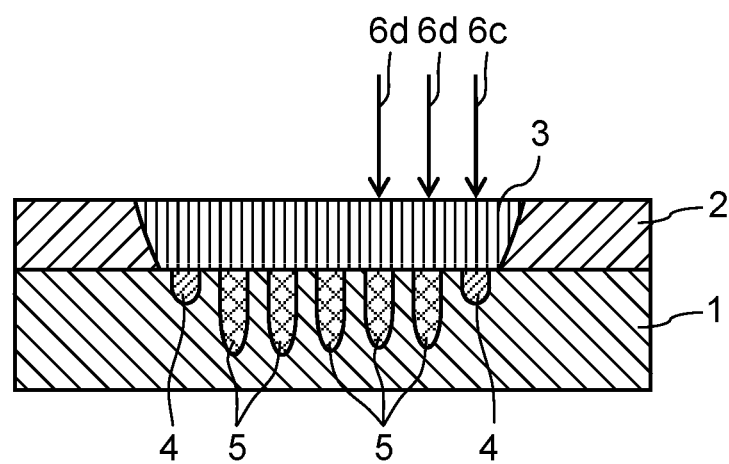
FIG. 6B is a sectional view showing a welding structure in the right angle direction to the scanning direction in a case where no gap is formed in Example 5.
Figure 6C:
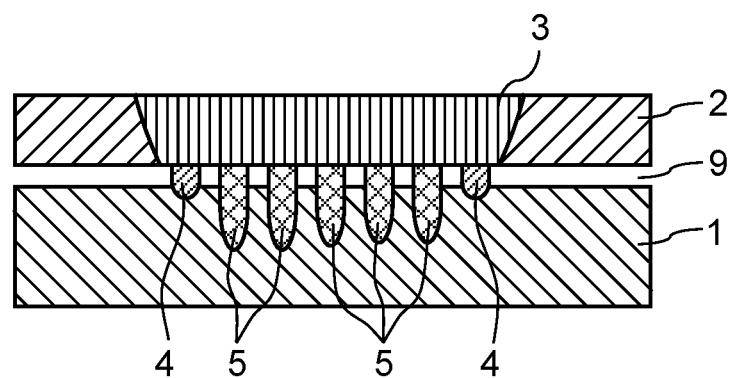
FIG. 6C is a sectional view showing the welding structure in the right angle direction to the scanning direction in a case where a gap is formed in Example 5.
Figure 7A:
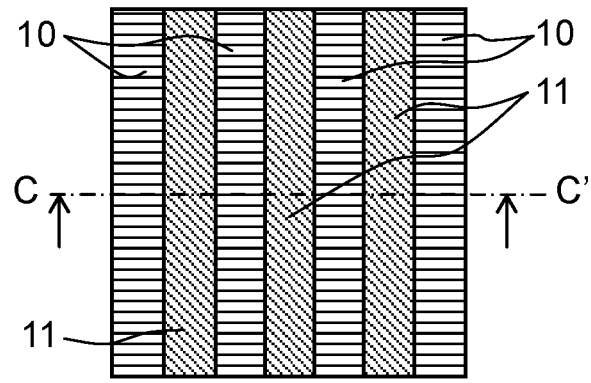
FIG. 7A is a top view showing a laser irradiation pattern of Example 6, 7, or 8 in Exemplary Embodiment 2.
Figure 7B:
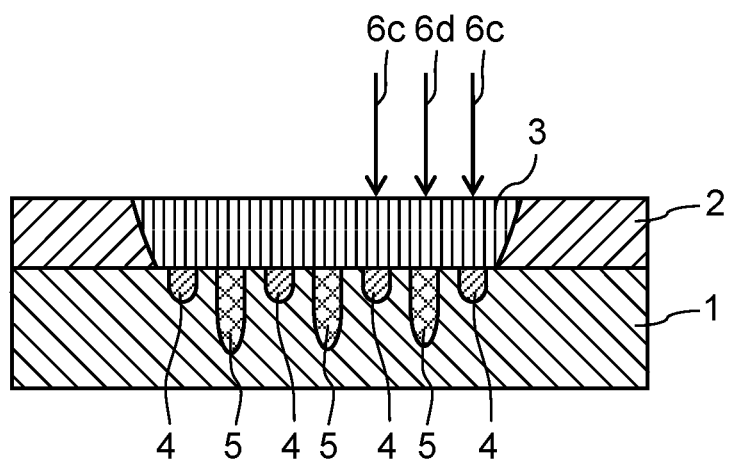
FIG. 7B is a sectional view showing a welding structure in the right angle direction to the scanning direction in a case where no gap is formed in Example 6, 7, or 8.
Figure 7C:
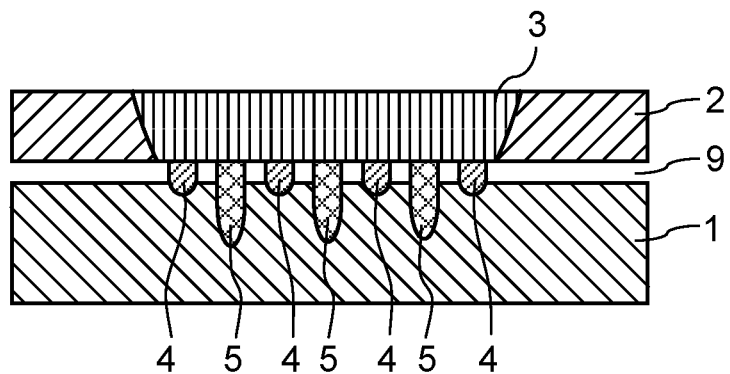
FIG. 7C is a sectional view showing the welding structure in the right angle direction to the scanning direction in a case where a gap is formed in Example 6, 7, or 8.
Figure 8A:
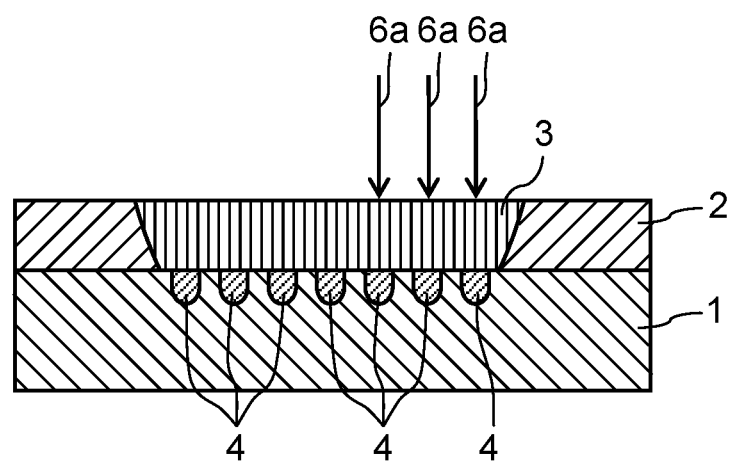
FIG. 8A is a sectional view showing a welding structure in the right angle direction to the scanning direction in a case where no gap is formed in Comparative Example 1.
Figure 8B:
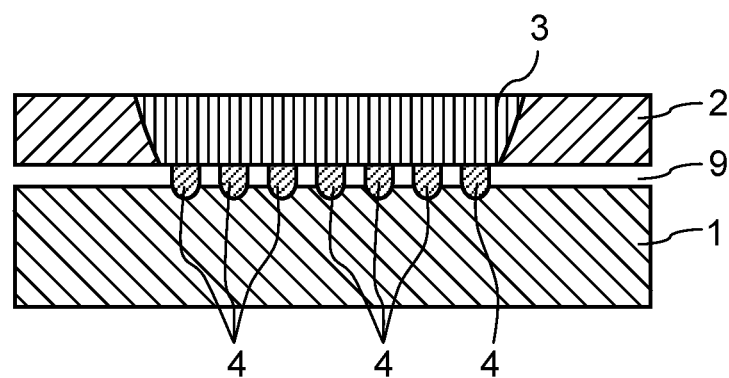
FIG. 8B is a sectional view showing the welding structure in the right angle direction to the scanning direction in a case where a gap is formed in Comparative Example 1.
Figure 9A:
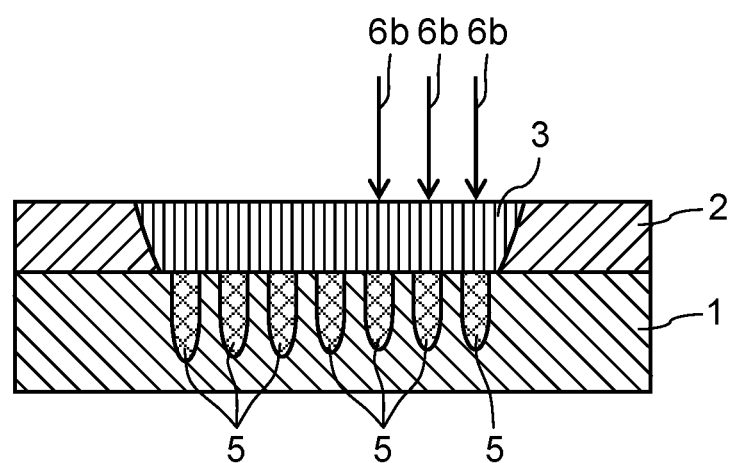
FIG. 9A is a sectional view showing a welding structure in the right angle direction to the scanning direction in a case where no gap is formed in Comparative Example 2.
Figure 9B:
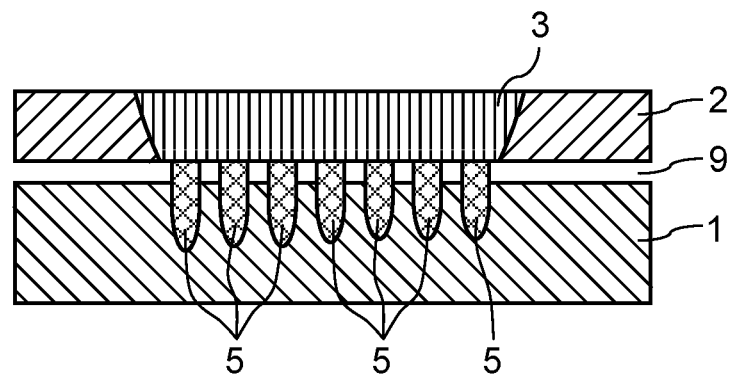
FIG. 9B is a sectional view showing the welding structure in the right angle direction to the scanning direction in a case where a gap is formed in Comparative Example 2.
Figure 10A:
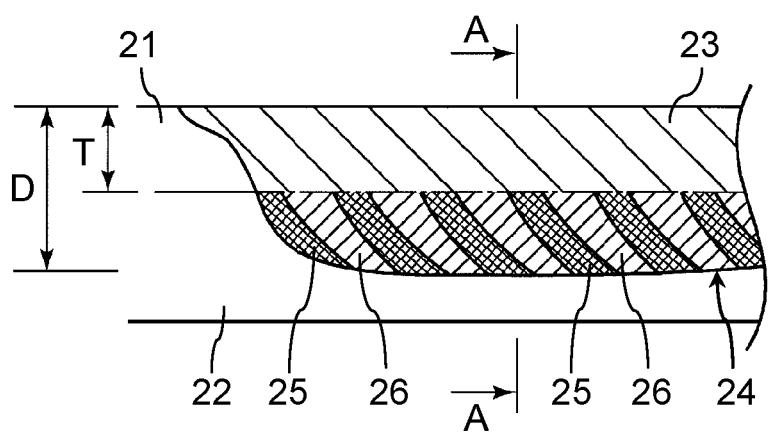
FIG. 10A is a sectional view showing a welding structure in the related art in the scanning direction.
Figure 10B:
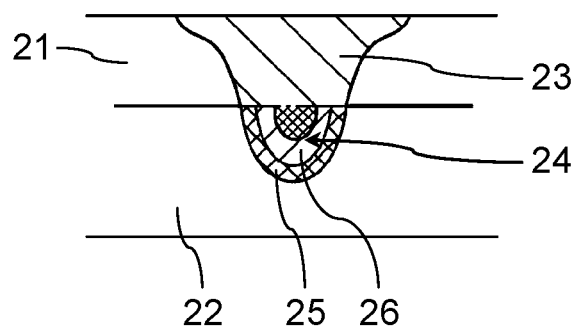
FIG. 10B is a sectional view showing the welding structure in the related art in the right angle direction to the scanning direction, which is taken along line A-A in FIG. 10A.

| Exemplary Embodiment | Number of solidifying portions having shallow depth | Laser irradiation condition for solidifying portions having shallow/deep depth | Gap | Corresponding drawings | Example/Comparative Example |
|---|---|---|---|---|---|
| Exemplary Embodiment 1 | One position | Low output/high output | Not-formed/formed | FIGS. 1A, 1B, and 2 | Example1 |
| | Two positions | | Not-formed/formed | FIGS. 3A and 3B | Example2 |
| | Alternately formed (substantially the same number as number of solidifying portions having deep depth) | | Not-formed/formed | FIGS. 4A and 4B | Example3 |
| | All having shallow depth | Low output | Not-formed/formed | FIGS. 8A and 8B | Comparative Example 1 |
| | All having deep depth | High output | Not-formed/formed | FIGS. 9A and 9B | Comparative Example 2 |
| Exemplary Embodiment 2 | One position | High-speed scanning/low-speed scanning | Not-formed/formed | FIGS. 5A to 5C | Example 4 |
| | Two positions | | Not-formed/formed | FIGS. 6A to 6C | Example 5 |
| | Alternately formed (substantially the same number as number of solidifying portions having deep depth) | | Not-formed/formed | FIGS. 7A to 7C | Example 6 Example 7 (ratio of depths) Example 8 (distance between solidifying portions) |

Hereinafter, exemplary embodiments will be described.

Exemplary Embodiment 1

In Exemplary Embodiment 1, an example of a first member is a metal member containing aluminum, and an example of a second member is a metal member containing copper. More specifically, a busbar for connecting battery cells is an example of the first member, and a terminal of a cell is an example of the second member. The first member and the second member may be respective metals that form an alloy.

FIG. 1 is a view for illustrating a welding structure or a welding structure body between a nickel-plated copper portion 3 as an example of a first solidifying portion. On the other hand, in a region from a portion close to an interface between aluminum busbar 2 and nickel-plated copper terminal 1 to a portion in which the vicinity of the interface of nickel-plated copper terminal 1 is melted, aluminum, nickel, and copper are mixed in a state of being melted, and as first laser beam 6a travels away from aluminum busbar 2, third alloy solidifying portion 4 having a shallow depth (that is, a length) is formed. Here, in order to suppress an influence on production of an intermetallic compound, the shallow depth means a case of a shallow depth of about 5 mm as an example.

Next, as second scanning, scanning is performed with second laser beam 6b set to have a higher output than that of first laser beam 6a along track 7, along linear track 8 shown in FIG. 1A which is parallel to linear track 7 and is next to track 7 in a downward direction from above in FIG. 1A, that is, from a back side to a front side in FIG. 1B, similarly to first laser beam 6a. An output of second laser beam 6b is at least 105% or higher than that of first laser beam 6a.

Then, second laser beam 6b travels away from aluminum busbar 2. In this manner, aluminum melted with second laser beam 6b is solidified, and aluminum busbar 2 in a region closer to the interface of nickel-plated copper terminal 1 from the surface of aluminum busbar 2 becomes first aluminum solidifying portion 3. On the other hand, in a region in which the vicinity of the interface of nickel-plated copper terminal 1 from a portion close to an interface between aluminum busbar 2 and nickel-plated copper terminal 1 is melted, aluminum, a small amount of nickel for plating, and copper are mixed to a portion as deep as the output of second laser beam 6b is higher than the output of first laser beam 6a in a state where aluminum, nickel, and copper are melted, second laser beam 6b travels away from aluminum busbar 2, and thereby second alloy solidifying portion 5 having a deep depth is formed.

In this case, an interval between track 7 of first laser beam 6a and track 8 of second laser beam 6b is small to the extent that the tracks approach each other to become one track in first solidifying portion 3 of aluminum busbar 2, and the interval is adjusted in third solidifying portion 4 and second solidifying portion 5 inside nickel-plated copper terminal 1 such that the portions are positioned to be separated from each other. Here, for example, the output of first laser beam 6a is 1,600 W, the output of second laser beam 6b is 2,000 W, an interval between third solidifying portion 4 and second solidifying portion 5 is 0.25 mm, and a thickness of the aluminum busbar is 1 mm. After scanning with first laser beam 6a is performed along track 7, a melting portion melted with first laser beam 6a is rapidly cooled to become third solidifying portion 4; however, when scanning with second laser beam 6b is performed along track 8, third solidifying portion 4 still has a high temperature. Hence, a melted metal portion that is melted with second laser beam 6b has a temperature higher than a melting temperature when scanning with second laser beam 6b is performed only once, due to heat conduction from third solidifying portion 4. However, regarding the temperature of the melted metal portion that is melted with second laser beam 6b, since the melted metal portion is separated from third solidifying portion 4 by a distance, and unmelted copper is present between third solidifying portion 4 and the melted metal portion, a heat conduction rate to the melted metal portion is attenuated due to heat conduction in a parallel direction to a laser scanning direction in the portions, and an increase in temperature is significantly suppressed.

Subsequently, as a third scan, in FIG. 1B, scanning is performed while irradiation with third laser beam 6b is performed along track 8 adjacent to track 8 along which the scanning has been performed, similarly to second laser beam 6b. Consequently, first aluminum solidifying portion 3 is formed in a region close to the surface of aluminum busbar 2, and second alloy solidifying portion 5 having a deep depth is formed in the vicinity of the interface between aluminum busbar 2 and nickel-plated copper terminal 1.

Then, as forth and subsequent scans, sequentially, a shift in the laser beam is performed, and scanning with fourth to n-th (n is an integer of 5 or greater) laser beams 6b is similarly performed along tracks 8 parallel to track 8. In this manner, a welding structure in which third solidifying portion 4 or second solidifying portions 5 in FIG. 1B are separated from each other is obtained. Here, when the second scanning with second laser beam 6b is performed following the first scanning with first laser beam 6a, the second scanning with second laser beam 6b is performed along second track 8 moved by a distance at which melting portions of nickel-plated copper terminal 1 by the first scanning are separable from each other. Similarly, when the third scan with third laser beam 6b is performed following the second scanning with second laser beam 6b, the third scan with third laser beam 6b is performed along third track 8 moved by a distance at which melting portions of nickel-plated copper terminal 1 by the second scanning are separable from each other. The following scans are performed in the similar manner.

In FIG. 1B, third alloy solidifying portion 4 having a shallow depth has a low temperature during melting because the output of first laser beam 6a is lower than the output of second laser beam 6b. Therefore, when first laser beam 6a travels to be away from the melting portion, the melting portion is rapidly solidified. Therefore, the melting portion has a short period of melting time, the intermetallic compound is unlikely to be formed, and an alloy (that is, a solid solution having a large number of lattice defects) becomes a main component normally. Hence, a shift of a lattice simply occurs due to tensile stress, the stress is alleviated, and thus welding with a high strength is performed.

On the other hand, since outputs are higher in second solidifying portions 5 formed with the high output of second to n-th laser beams 6b than in third solidifying portion 4, the temperature is high during the melting. Therefore, a period of time is sufficiently long from when second to n-th laser beams 6b moves to be away from the respective melting portions to when the solidifying is performed, and a large amount of intermetallic compound having few lattice defects is formed. In other words, a larger amount of intermetallic compound is present in second solidifying portion 5 than in third solidifying portion 4. By contrast, adjacent second solidifying portions 5 are formed to be separated from each other, and thereby it is possible to release heat from the melting portion via the unmelted portions. Therefore, it is possible to further suppress generation of the intermetallic compound, compared with a case where solidifying portions are in close contact with each other. In such a configuration, third solidifying portion 4 or second solidifying portions 5 in nickel-plated copper terminal 1 in FIG. 1B are separated from each other so as to have intervals, and a bonding portion is formed. Therefore, when third solidifying portion 4 and second solidifying portions 5 are melted with first laser beam 6a and second laser beam 6b, respectively, and are solidified, heat accumulation by previous track 7 or 8 is unlikely to influence the solidifying portions, and thus it is possible to suppress an increase in temperature. Therefore, it is possible to suppress generation of a large amount of intermetallic compound in solidifying portions, and it is possible to cause dissimilar metal welding with a high bonding strength. An area ratio of the intermetallic compound to a section of second solidifying portion 5 is desirably 0% or higher and 10% or lower.

A plurality of second solidifying portion 5 and a plurality of third solidifying portions 4 are connected to the same first solidifying portion 3.

In the configuration of Exemplary Embodiment 1, as shown in FIG. 1B, in a case where little gap 9 of aluminum busbar 2 is formed on nickel-plated copper terminal 1, it is also possible to maintain the high strength by third solidifying portion 4. In addition, in a case where gap 9 of aluminum busbar 2 is formed on nickel-plated copper terminal 1 as shown in FIG. 2 due to variations in production, third solidifying portion 4 having a shallow depth is little melted with copper terminal 1, and little tensile strength is obtained by third solidifying portion 4. However, in this case, the plurality of second solidifying portions 5 having a deep depth are melted with copper terminal 1 in a wide area. Hence, each second solidifying portion 5 has a low tensile strength; however, it is possible to form a bonding portion having a welding structure with a high tensile strength, overall. In this manner, the welding structure of this disclosure includes both of deep second solidifying portions 5 and third solidifying portions 4 at at least one or more positions on a section in a right angle direction to a proceeding direction of welding. Second solidifying portion 5 has the deep depth from an overlapped position through irradiation with second laser beam 6b having high irradiating energy. Third solidifying portion 4 has the shallow depth from the overlapped position through irradiation with first laser beam 6a having low irradiating energy. In this manner, even in a case where little gap 9 of aluminum busbar 2 is formed on nickel-plated copper terminal 1 due to variations in production, or in a case where large gap 9 is formed, it is possible to perform stable welding with the high bonding strength by using an inexpensive holding jig.

When third solidifying portion 4 having the shallow depth is provided at at least one position, an effect of maintaining the bonding strength is achieved in a case where little gap 9 is formed as described above. However, it is preferable that third solidifying portions 4 having the shallow depth are provided at two or more positions in order to distribute the stress without concentration of the stress at one position. In this case, for the same reason as the case where gap 9 is formed, it is also preferable that second solidifying portions 5 having the deep depth are provided at two or more positions. As an example thereof, FIGS. 3A and 3B show a case where second solidifying portions 5 having the deep depth are provided at five positions at the center, and third solidifying portions 4 having the shallow depth are provided at two positions at both ends. FIG. 3A shows a case where no gap 9 is formed, and FIG. 3B shows a case where gap 9 is formed. In FIGS. 3A and 3B, third solidifying portions 4 having the shallow depth are provided at both ends; however, the positions of third solidifying portions 4 are not limited thereto, and third solidifying portions 4 may be provided at three or more positions.

FIGS. 4A and 4B show a case where third solidifying portions 4 and second solidifying portions 5 are alternately disposed. FIG. 4A shows a case where no gap 9 is formed, and FIG. 4B shows a case where gap 9 is formed. Third solidifying portions 4 having the shallow depth and second solidifying portions 5 having deep depth are alternately disposed in a direction intersecting (for example, an orthogonal direction to) the scanning direction of laser beams 6a and 6b. In this manner, the number of third solidifying portions 4 is the same as the number of second solidifying portions 5; however, it is preferable that a difference in the number between the portions is ±1, because the tensile stress is uniformly distributed to the entire welding portion, and resistance to breaking improves to be stable without concentration of the stress.

Example 1

The following specific examples of Exemplary Embodiment 1 will be described. In FIG. 1B, aluminum busbar 2 having a thickness of 1 mm is overlapped on copper terminal 1 having a thickness of 2 mm subjected to nickel plating having a plating thickness of 6 μm. In this manner, copper terminal 1 and aluminum busbar 2 are disposed to prevent gap 9 from being open therebetween as little as possible by a jig (not shown) that comes into press contact downward from above with aluminum busbar 2. Scanning is performed along track 7 for forming third solidifying portion 4 having the shallow depth from the surface of aluminum busbar 2, while irradiation with first laser beam 6a having an output of 1,600 W by oscillation from a fiber laser is performed in a distance of 10 mm at a speed of 800 mm/s.

Next, scanning is performed along track 8 for forming second solidifying portions 5 having the deep depth by performing a horizontal shift with respect to track 7 by 0.25 mm, with second laser beam 6b having an output of 2,000 W in a distance of 10 mm at a speed of 800 mm/s, similarly to first laser beam 6a.

Then, sequentially, scanning with laser beams 6b is performed six times in total while a shift is performed by 0.25 mm each time, similarly to second laser beam 6b. In this case, tensile strengths (peeling strength) toward an upper side in FIG. 1B were measured to be 202 N, 157 N, and 168 N in three samples which are similarly prepared, and the strengths were all high tensile strengths exceeding 150 N.

Next, as shown in FIG. 2, aluminum busbar 2 is disposed on nickel-plated copper terminal 1 such that gap 9 is open to have a size of 0.1 mm, and welding is performed as described above. In this case, tensile strengths were 198 N, 207 N, and 232 N in three samples which are similarly prepared, and the strengths were all high tensile strengths exceeding 150 N even in a case where gap 9 is formed to have a size of 0.1 mm.

In addition, a laser irradiation pattern was changed such that third solidifying portion 4 having the shallow depth was disposed at the fourth position from the right side from the rightmost position in FIG. 1B, and the same welding was performed. As a result, in both the case where no gap 9 was formed and the case where gap 9 was formed to have a size of 0.1 mm, the tensile strengths exceeding 150 N were similarly obtained.

Further, the laser irradiation pattern was changed such that third solidifying portion 4 having the shallow depth was disposed at the leftmost position, and the same welding was performed. As a result, in both the case where no gap 9 was formed and the case where gap 9 was formed to have a size of 0.1 mm, the tensile strengths exceeding 150 N were similarly obtained.

In this manner, the bonding portion has the welding structure in which at least one third solidifying portion 4 having the shallow depth and the plurality of second solidifying portions 5 having the deep depth are formed, and thereby it is possible to realize stable welding regardless of gap 9.

In Example 1, each of a plating thickness, a thickness of a terminal, and a thickness of a busbar is described as an example thereof. However, content of this disclosure is not limited to such values. In addition, a condition of a laser output, a welding speed, a scanning interval, or the like depends on a material of a metal member to be welded, a surface state, a plate thickness, or a total heat capacity including a jig, and thus the condition of this disclosure is not limited.

In addition, in Example 1, only the three positions of third solidifying portions 4 having the shallow depth of the rightmost position, the fourth position from the right side, and the leftmost position are described. However, it is also possible to obtain the same effects when the third solidifying portion is disposed at any positions.

In Example 1, the fiber laser is used as a laser oscillator; however, it is also possible to obtain the same effects by using another laser such as a DISK laser, a YAG laser, a $CO_2$ laser, or a semiconductor laser by which a high output is obtained.

In Example 1, case examples of the nickel-plated copper terminal and the aluminum busbar are described. However, when metals that forms an alloy are combined, it is also possible to obtain the same effects even when other metals are combined.

Example 2

Welding in Example 2 is performed in the same manner as the welding in Example 1 except for disposition of track 7 of first laser beam 6a for forming third solidifying portion 4 having the shallow depth and track 8 of second laser beam 6b for forming second solidifying portion 5 having the deep depth.

As shown in FIG. 3A, aluminum busbar 2 is disposed on nickel-plated copper terminal 1 such that no gap 9 is formed. Then, a change to a laser irradiation pattern is performed such that third solidifying portions 4 having the shallow depth are formed at two positions of the rightmost position and the leftmost position of the bonding position, and the same welding is performed. In this case, tensile strengths (in other words, bonding strength) were measured to be 170 N, 196 N, and 173 N in three samples which are similarly prepared, and the strengths were all high bonding strengths exceeding 150 N.

Next, as shown in FIG. 3B, aluminum busbar 2 is disposed on nickel-plated copper terminal 1 such that gap 9 is formed to have a size of 0.1 mm, and the same welding is performed. In this case, tensile strengths were measured to be 221 N, 190 N, and 199 N in three samples which are similarly prepared, and the strengths were all high bonding strengths exceeding 150 N.

Next, the laser irradiation pattern was changed such that third solidifying portions 4 having the shallow depth were positioned at the rightmost position and the fourth position from the right side from the rightmost position and the leftmost position in FIG. 3A, and the same welding was performed. As a result, in both the case where no gap 9 was formed and the case where gap 9 was formed to have a size of 0.1 mm, high tensile strengths in a range from 150 N to 230 N were obtained.

Further, the laser irradiation pattern was changed such that third solidifying portions 4 having the shallow depth were disposed at the fourth position from the right side and the leftmost position, and the same welding was performed. As a result, in both the case where no gap 9 was formed and the case where gap 9 was formed to have a size of 0.1 mm, high tensile strengths in a range from 150 N to 230 N were obtained.

In this manner, the bonding portion has the welding structure in which two third solidifying portions 4 having the shallow depth and the plurality of second solidifying portions 5 having the deep depth other than the third solidifying portions are formed, and thereby it is possible to realize stable welding regardless of gap 9.

In Example 2, only three disposition modes of third solidifying portions 4 having the shallow depth at the rightmost position and the leftmost position, the rightmost position and the fourth position from the right side, and the fourth position from the right side and the leftmost position are described. However, it is also possible to obtain the same effects when third solidifying portions 4 are disposed at any positions.

Example 3

Welding in Example 3 is performed in the same manner as the welding in Example 1 except for disposition of track 7 of first laser beam 6a for forming third solidifying portion 4 having the shallow depth and track 8 of second laser beam 6b for forming second solidifying portion 5 having the deep depth.

As shown in FIG. 4A, aluminum busbar 2 is disposed on nickel-plated copper terminal 1 such that no gap 9 is formed. Then, third solidifying portions 4 having the shallow depth is formed at the rightmost position, and second solidifying portion 5 having deep depth is formed at a left position of the third solidifying portion in the direction intersecting (for example, the orthogonal direction to) the scanning direction of laser beams 6a and 6b. Further, third solidifying portion 4 having the shallow depth is formed at a left position of the second solidifying portion, and second solidifying portion 5 having the deep depth is formed at a left position of the third solidifying portion. In this manner, the same welding was performed with a laser irradiation pattern for achieving a welding structure in which third solidifying portions 4 having the shallow depth and second solidifying portions 5 having the deep depth are alternately disposed. In this case, tensile strengths were measured to be 211 N, 201 N, and 233 N in three samples which are similarly prepared, and the strengths were all high bonding strengths exceeding 150 N.

Next, as shown in FIG. 4B, aluminum busbar 2 is disposed on nickel-plated copper terminal 1 such that gap 9 is formed to have a size of 0.1 mm.
Then, the same welding is performed. In this case, tensile strengths were measured to be 198 N, 226 N, and 201 N in three samples which are similarly prepared, and the strengths were all high bonding strengths exceeding 150 N.

In this manner, the bonding portion has the welding structure in which third solidifying portions 4 having the shallow depth and second solidifying portions 5 having the deep depth are alternately disposed, and thereby it is possible to realize stable welding regardless of gap 9.

In Example 3, third solidifying portion 4 having the shallow depth was disposed on the rightmost position, and then second solidifying portions 5 having the deep depth were sequentially formed. However, when second solidifying portion 5 having the deep depth is first formed, and then third solidifying portions 4 having the shallow depth are sequentially formed, it is possible to obtain the same effects.

Comparative Example 1

Welding in Comparative Example 1 is performed in the same manner as the welding in Example 1 except that only third solidifying portions 4 having the shallow depth are formed without forming second solidifying portion 5 having the deep depth.

As shown in FIG. 8A, aluminum busbar 2 is disposed on nickel-plated copper terminal 1 such that no gap 9 is formed. Then, the laser irradiation pattern was changed such that only third solidifying portions 4 having the shallow depth are formed, and the same welding is performed. In this case, tensile strengths were measured to be 224 N, 215 N, and 231 N in three samples which are similarly prepared, and the strengths were all high bonding strengths exceeding 200 N.

Next, as shown in FIG. 8B, aluminum busbar 2 is disposed on nickel-plated copper terminal 1 such that gap 9 is formed to have a size of 0.1 mm, and the same welding is performed. In this case, tensile strengths were measured to be 26 N, 52 N, and 9 N in three samples which are similarly prepared, and the strengths were all bonding strengths lower than 100 N.

When no gap 9 is formed in the welding structure in which only third solidifying portions 4 having the shallow depth are formed, generation of the intermetallic compound is suppressed such that a normal alloy layer having high resistance to stress is formed, and thus it is possible to alleviate tensile stress such that it is possible to obtain a high bonding strength. On the other hand, in a case where gap 9 is formed, an amount of melting for generating an alloy with nickel-plated copper terminal 1 is too much reduced, and thus the boding strength is likely to remarkably decrease. In this manner, if it is possible to prevent gap 9 from being formed, it is possible to obtain the high bonding strength; however, it is difficult to stably and reliably prevent gap 9 from being formed in actual production, and thus it is not possible to perform stable production.

Comparative Example 2

Welding in Comparative Example 2 is performed in the same manner as the welding in Example 1 except that only second solidifying portions 5 having the deep depth are formed without forming third solidifying portion 4 having the shallow depth.

As shown in FIG. 9A, aluminum busbar 2 is disposed on nickel-plated copper terminal 1 such that no gap 9 is formed. Then, the laser irradiation pattern was changed such that only second solidifying portions 5 having the deep depth are formed, and the same welding is performed. In this case, tensile strengths were measured to be 103 N, 149 N, and 144 N in three samples which are similarly prepared, and the strengths were all bonding strengths lower than 150 N.

Next, as shown in FIG. 9B, aluminum busbar 2 is disposed on nickel-plated copper terminal 1 such that gap 9 is formed to have a size of 0.1 mm. Then, the same welding is performed. In this case, tensile strengths were measured to be 188 N, 204 N, and 212 N in three samples which are similarly prepared, and the strengths were all high bonding strengths of 150 N or more.

When no gap 9 is formed in the welding structure in which only second solidifying portions 5 having the deep depth are formed, a large amount of the intermetallic compound is generated such that it is not possible to alleviate tensile stress. Therefore, the bonding strength is lower than that in a state of no gap 9 in Comparative Example 1. On the other hand, in a case where gap 9 is formed, forming of the large amount of the intermetallic compound in nickel-plated copper terminal 1 is alleviated. Therefore, the higher bonding strength is obtained than the case of no gap 9. In this manner, when an output of a laser beam for irradiation is improved, it is possible to stably obtain the bonding strength to a certain degree even in the case where no gap 9 is formed or the case where gap 9 is formed. However, it is not possible to stably obtain the high bonding strength with a narrow bonding area, and it is necessary to increase a welding area in busbar welding that needs the high bonding strength, and thus it is difficult to perform production at low costs.

As described above, in the welding in Examples, 1, 2, and 3, it is possible to perform stabler welding than in the comparative examples, both in the case where gap 9 is formed and the case where no gap 9 is formed, and thus it is possible to realize the welding with a high yield at low costs.

Exemplary Embodiment 2

FIGS. 5A, 5B, and 5C are views for illustrating a welding pattern between the nickel-plated copper terminal and the aluminum busbar of a cell in Exemplary Embodiment 2.

As shown in FIG. 5B, a connection portion of aluminum busbar 2 is disposed to be overlapped on nickel-plated copper terminal 1. In this case, although not shown in the drawing, gap 9 between aluminum busbar 2 and nickel-plated copper terminal 1 is to be as small as possible by a jig that comes into press contact downward from above in FIG. 5B with a region of a surface of aluminum busbar 2, which is not irradiated with a laser.

Next, while irradiation is performed with first laser beam 6c set to have any output, scanning is performed at any speed along linear track 10 shown in FIG. 5A in a downward direction from above in FIG. 5A, that is, from a back side to a front side in FIG. 5B. Consequently, the vicinity of a portion of aluminum busbar 2, which is irradiated with first laser beam 6c, is melted.

Then, first laser beam 6c travels away from aluminum busbar 2. In this manner, aluminum melted with first laser beam 6c is solidified, and aluminum busbar 2 in a region closer to the interface of nickel-plated copper terminal 1 from the surface of aluminum busbar 2 becomes first aluminum solidifying portion 3. On the other hand, in a region in which the vicinity of the interface of nickel-plated copper terminal 1 from a portion close to an interface between aluminum busbar 2 and nickel-plated copper terminal 1 is melted, aluminum, a small amount of nickel for plating, and copper are mixed in a state of being melted. In this manner, first laser beam 6c travels away from aluminum busbar 2, and thereby third alloy solidifying portion 4 having the shallow depth is formed.

Next, scanning is performed with second laser beam 6d having the same output as that of first laser beam 6c along linear track 11 shown in FIG. 5A which is parallel to linear track 10 and is next to track 10 in a downward direction from above in FIG. 5A, that is, from the back side to the front side in FIG. 5B. Here, scanning with second laser beam 6d is performed at a slower speed of at least 25%, preferably 50% of the speed of first laser beam 6c.

Then, second laser beam 6d travels away from aluminum busbar 2. In this manner, aluminum melted with second laser beam 6d is solidified, and aluminum busbar 2 in a region closer to the interface of nickel-plated copper terminal 1 from the surface of aluminum busbar 2 becomes first aluminum solidifying portion 3. On the other hand, in a region in which the vicinity of the interface of the interface of nickel-plated copper terminal 1 from the portion close to the interface between aluminum busbar 2 and nickel-plated copper terminal 1 is melted, in a state in which aluminum, a small amount of nickel for plating, and copper are melted, a period of melting time is lengthened by a slower scanning speed of second laser beam 6d than the scanning speed of first laser beam 6c. Therefore, mixing is performed to a deeper position, second laser beam 6d travels away from aluminum busbar 2, and thereby second alloy solidifying portion 5 having the deep depth is formed.

In this case, an interval between track 10 of first laser beam 6c and track 11 of second laser beam 6d is small to the extent that the tracks approach each other so as to form one block of first solidifying portion 3 of aluminum busbar 2, and third solidifying portion 4 and second solidifying portion 5 inside nickel-plated copper terminal 1 are positioned to be separated from each other. Here, first laser beam 6c and second laser beam 6d have an output of 1,600 W. A scanning speed of first laser beam 6c is 800 mm/sec, and a scanning speed of second laser beam 6d is 500 mm/sec. An interval between first laser beam 6c and second laser beam 6d is 0.25 mm. A thickness of aluminum busbar 2 is 1 mm. After scanning with first laser beam 6c is performed along track 10, a melting portion melted with first laser beam 6c is rapidly cooled to become third solidifying portion 4. However, when scanning is performed along track 11 with next second laser beam 6d, a high temperature is maintained in third solidifying portion 4. Hence, a melted metal portion that is melted with second laser beam 6d has a temperature higher than a melting temperature when scanning with second laser beam 6d is performed only once, due to heat conduction from third solidifying portion 4. However, regarding the temperature of the melted metal portion that is melted with second laser beam 6d, since the melted metal portion is separated from third solidifying portion 4 by a distance, and unmelted copper is present between third solidifying portion 4 and the melted metal portion, a heat conduction rate to the melted metal portion is attenuated due to heat conduction in a parallel direction to the laser scanning direction in the portions, and an increase in temperature is significantly suppressed.

Subsequently, in FIG. 5B, scanning is performed while irradiation with third laser beam 6d is performed along a track adjacent to the track along which the scanning has been performed, similarly to second laser beam 6d. Similarly, first aluminum solidifying portion 3 is formed in the region close to the surface of aluminum busbar 2, and second alloy solidifying portion 5 having the deep depth is formed in the vicinity of the interface between aluminum busbar 2 and nickel-plated copper terminal 1. Then, sequentially, a shift in the laser beam is performed, and scanning with fourth to n-th (n is an integer of 5 or greater) laser beams 6d is similarly performed along tracks 8 parallel to track 11. In this manner, a welding structure in which third solidifying portion 4 or second solidifying portions 5 in FIG. 5B are separated from each other is obtained.

In FIG. 5B, third alloy solidifying portion 4 having the shallow depth has a low temperature during melting because the scanning speed of first laser beam 6c is slower than the scanning speed of second laser beam 6d, and a period of heating time is short. Therefore, when first laser beam 6c travels to be away from the melting portion, the melting portion is rapidly solidified. Therefore, the melting portion has a short period of melting time and does not become the intermetallic compound but becomes an alloy (that is, a state of having a large number of lattice defects) normally, and thus, a shift of a lattice simply occurs due to tensile stress. Hence, the stress is alleviated, and thus welding with the high strength is performed.

On the other hand, since the scanning speed is slower and the heating time is lengthened in second solidifying portions 5 than in third solidifying portion 4 such that the second solidifying portions formed at the slower scanning speed of second to n-th laser beams 6d have the higher temperature higher during the melting. Therefore, a period of time is sufficiently long to the solidifying even when second to n-th laser beams 6d moves to be away from the respective melting portions, and a large amount of intermetallic compound having few lattice defects is formed. In the intermetallic compound, since the shift of the lattice due to the tensile stress is unlikely to occur, and it is not possible to alleviate the stress, lattices are separated from each other with a tensile force lower than that of third solidifying portion 4, and the intermetallic compound has a characteristic of having a low tensile strength.

In the configuration of Exemplary Embodiment 2 described above, as shown in FIG. 5B, in a case where little gap 9 of aluminum busbar 2 is formed on nickel-plated copper terminal 1, it is also possible to maintain the high strength by third solidifying portion 4. In addition, in a case where gap 9 of aluminum busbar 2 is formed on nickel-plated copper terminal 1 as shown in FIG. 5C due to variations in production, third solidifying portion 4 having the shallow depth is little melted with copper terminal 1, and little tensile strength is obtained by third solidifying portion 4. However, in this case, the plurality of second solidifying portions 5 having the deep depth are melted with copper terminal 1 in a wide area. Hence, each second solidifying portion 5 has the low tensile strength; however, it is possible to form the bonding portion having the welding structure with the high tensile strength, overall. In this manner, second solidifying portion 5 and third solidifying portion 4 are formed at least one or more positions. Here, second solidifying portion 5 has the deep depth from an overlapped position through irradiation with second laser beam 6d having high irradiating energy, on the section in the right angle direction to the proceeding direction of the welding. In addition, third solidifying portion 4 has the shallow depth from the overlapped position through irradiation with first laser beam 6c having low irradiating energy, on the section in the right angle direction to the proceeding direction of the welding. In the configuration, in both the case where little gap 9 of aluminum busbar 2 is formed on nickel-plated copper terminal 1 due to variations in production and the case where large gap 9 is formed, it is possible to perform stable welding with the high bonding strength by using an inexpensive holding jig.

In addition, when third solidifying portion 4 having the shallow depth is provided at at least one position, an effect of maintaining the bonding strength is achieved in a case where little gap 9 is formed as described above. However, it is preferable that third solidifying portions 4 having the shallow depth are provided at two or more positions in order to distribute the stress without concentration of the stress at one position. In this case, for the same reason as the case where gap 9 is formed, it is also preferable that second solidifying portions 5 having the deep depth are provided at two or more positions. As an example thereof, in a case where second solidifying portions 5 having the deep depth are provided at five positions at the center, and third solidifying portions 4 having the shallow depth are provided at two positions at both ends, FIG. 6B shows a case where no gap 9 is formed, and FIG. 6C shows a case where gap 9 is formed. In addition, in this case, FIG. 6A shows an irradiation pattern of the laser beam when viewed from a top surface. In FIGS. 6B and 6C, third solidifying portions 4 having the shallow depth are provided at both ends; however, the positions of shallow third solidifying portions 4 are not limited thereto, and third solidifying portions 4 may be provided at three or more positions. FIGS. 6A, 6B, and 6C will be described in Example 5 in detail.

FIGS. 7A, 7B, and 7C show an example in which third solidifying portions 4 having the shallow depth and second solidifying portions 5 having the deep depth are alternately disposed. FIG. 7B shows a case where no gap 9 is formed, and FIG. 7C shows a case where gap 9 is formed. In addition, in this case, FIG. 7A shows an irradiation pattern of the laser beam when viewed from the top surface. In this manner, third solidifying portions 4 having the shallow depth and second solidifying portions 5 having the deep depth are alternately disposed, and the number of third solidifying portions is the same as the number of second solidifying portions; however, it is most preferable that a difference in the umber between the portions is ±1, because the tensile stress is uniformly distributed to the entire welding portion, and resistance to breaking improves to be stable without concentration of the stress. FIGS. 7A, 7B, and 7C will be described in Example 6 in detail.

Example 4

The following specific examples of Exemplary Embodiment 2 will be described.

In FIG. 5B, aluminum busbar 2 having the thickness of 1 mm is overlapped on copper terminal 1 having the thickness of 2 mm subjected to nickel plating having the plating thickness of 6 µm. In this manner, copper terminal 1 and aluminum busbar 2 are disposed to prevent gap 9 from being open as little as possible therebetween by a jig (not shown) that comes into press contact downward from above with aluminum busbar 2. Scanning is performed along track 10 for forming third solidifying portion 4 having the shallow depth from the surface of aluminum busbar 2, while irradiation with first laser beam 6c having the output of 1,600 W by oscillation from the fiber laser is performed in the distance of 10 mm at the speed of 800 mm/s.

Next, scanning is performed along track 11 for forming second solidifying portions 5 having the deep depth by performing a horizontal shift with respect to track 10 by 0.25 mm, with second laser beam 6d having the output of 1,600 W in the distance of 10 mm at the speed of 500 mm/s.

Then, sequentially, scanning with laser beams 6d is performed six times in total while a shift is performed by 0.25 mm each time, similarly to second laser beam 6d. In this case, tensile strengths (peeling strength) toward an upper side in FIG. 5B were measured to be 177 N, 167 N, and 195 N in three samples which are similarly prepared, and the strengths were all high tensile strengths exceeding 150 N.

Next, as shown in FIG. 5C, aluminum busbar 2 is disposed on nickel-plated copper terminal 1 such that gap 9 is open to have the size of 0.1 mm, and welding is performed as described above. In this case, tensile strengths were 212 N, 210 N, and 200 N in three samples which are similarly prepared, and the strengths were all very high tensile strengths exceeding 200 N even in a case where gap 9 is formed to have the size of 0.1 mm.

The laser irradiation pattern was changed such that third solidifying portion 4 having the shallow depth was disposed at the fourth position from the right side from the rightmost position in FIG. 5B, and the same welding was performed. As a result, in both the case where no gap 9 was formed and the case where gap 9 was formed to have the size of 0.1 mm, the tensile strengths exceeding 150 N were similarly obtained.

Further, the laser irradiation pattern was changed such that third solidifying portion 4 having the shallow depth was disposed at the leftmost position, and the same welding was performed. As a result, in both the case where no gap 9 was formed and the case where gap 9 was formed to have the size of 0.1 mm, the tensile strengths exceeding 150 N were similarly obtained.

In this manner, the bonding portion had the welding structure in which at least one third solidifying portion 4 having the shallow depth and the plurality of second solidifying portions 5 having the deep depth were formed, and thereby it is possible to realize the stable welding regardless of gap 9.

In Example 4, each of a plating thickness, a thickness of a terminal, and a thickness of a busbar is described as an example thereof, and content of this disclosure is not limited to such values. In addition, a condition of a laser output, a welding speed, a scanning interval, or the like depends on a material of a metal member to be welded, a surface state, a plate thickness, or a total heat capacity including a jig, and thus the condition of this disclosure is not limited.

In addition, in Example 4, only the three positions of third solidifying portions 4 having the shallow depth of the rightmost position, the fourth position from the right side, and the leftmost position are described. However, it is also possible to obtain the same effects when the third solidifying portion is disposed at any positions.

In Example 4, the fiber laser is used as a laser oscillator; however, it is also possible to obtain the same effects by using another laser such as a DISK laser, a YAG laser, a $CO_2$ laser, or a semiconductor laser by which a high output is obtained.

Example 5

Welding in Example 5 is performed in the same manner as the welding in Example 4 except for disposition of track 10 of first laser beam 6c for forming third solidifying portion 4 having the shallow depth and track 11 of second laser beam 6d for forming second solidifying portion 5 having the deep depth.

As shown in FIG. GB, aluminum busbar 2 is disposed on nickel-plated copper terminal 1 such that no gap 9 is formed. Then, a change to a laser irradiation pattern shown in FIG. 6A is performed such that third solidifying portions 4 having the shallow depth are formed at two positions of the rightmost position and the leftmost position of the bonding position, and the same welding is performed. In this case, tensile strengths were measured to be 207 N, 228 N, and 210 N in three samples which are similarly prepared, and the strengths were all very high bonding strengths exceeding 200 N.

Next, as shown in FIG. 6C, aluminum busbar 2 is disposed on nickel-plated copper terminal 1 such that gap 9 is formed to have the size of 0.1 mm, and the same welding is performed. In this case, tensile strengths were measured to be 211 N, 208 N, and 209 N in three samples which are similarly prepared, and the strengths were all very high bonding strengths exceeding 200 N.

Next, the laser irradiation pattern was changed such that third solidifying portions 4 having the shallow depth were positioned at the rightmost position and the fourth position from the right side from the rightmost position and the leftmost position in FIG. 6B, and the same welding was performed. As a result, in both the case where no gap 9 was formed and the case where gap 9 was formed to have a size of 0.1 mm, a high tensile strength of 200 N or higher was obtained.

Further, the laser irradiation pattern was changed such that third solidifying portions 4 having the shallow depth were disposed at the fourth position from the right side and the leftmost position, and the same welding was performed. As a result, in both the case where no gap 9 was formed and the case where gap 9 was formed to have the size of 0.1 mm, a high tensile strength of 200 N or higher was similarly obtained.

In this manner, the bonding portion has the welding structure in which two third solidifying portions 4 having the shallow depth and the plurality of second solidifying portions 5 having the deep depth other than the third solidifying portions are formed, and thereby it is possible to realize the stable welding regardless of gap 9.

In Example 5, only three disposition modes of third solidifying portions 4 having the shallow depth at the rightmost position and the leftmost position, the rightmost position and the fourth position from the right side, and the fourth position from the right side and the leftmost position are described. However, it is also possible to obtain the same effects when the third solidifying portions are disposed at any positions.

Example 6

Welding in Example 6 is performed in the same manner as the welding in Example 4 except for disposition of track 10 of first laser beam 6c for forming third solidifying portion 4 having the shallow depth and track 11 of second laser beam 6d for forming second solidifying portion 5 having the deep depth.

As shown in FIG. 7B, aluminum busbar 2 is disposed on nickel-plated copper terminal 1 such that no gap 9 is formed. Then, a change of the laser irradiation pattern is performed such that third solidifying portion 4 having the shallow depth is formed at the leftmost position, and second solidifying portion 5 having the deep depth is formed at a left position of the third solidifying portion. Further, the same welding is performed with the laser irradiation pattern shown in FIG. 7A such that third solidifying portion 4 having the shallow depth is formed at a left position of the second solidifying portion, and second solidifying portion 5 having the deep depth is formed at a left position of the third solidifying portion. In this manner, the welding structure, in which third solidifying portions 4 having the shallow depth and second solidifying portions 5 having the deep depth are alternately disposed, is formed. In this case, tensile strengths were measured to be 224 N, 249 N, and 230 N in three samples which are similarly prepared, and the strengths were all very high bonding strengths exceeding 200 N.

Next, as shown in FIG. 7C, aluminum busbar 2 is disposed on nickel-plated copper terminal 1 such that gap 9 is formed to have the size of 0.1 mm, and the same welding is performed. In this case, tensile strengths were measured to be 207 N, 236 N, and 222 N in three samples which are similarly prepared, and the strengths were all very high bonding strengths exceeding 200 N.

In this manner, the bonding portion has the welding structure in which the third solidifying portions having the shallow depth and the second solidifying portions having the deep depth are alternately disposed, and thereby it is possible to realize the stable welding regardless of gap 9.

In Example 6, third solidifying portion 4 having the shallow depth was disposed on the rightmost position, and then second solidifying portions 5 having the deep depth were sequentially formed. However, when second solidifying portion 5 having the deep depth is first formed, and then third solidifying portions 4 having the shallow depth are sequentially formed, it is possible to obtain the same effects.

Example 7

A relationship between the bonding strength and a ratio of the depth of third solidifying portion 4 having the shallow depth and the depth of second solidifying portion 5 having the deep depth is studied.

As evaluation of the bonding strength, an upward tensile strength (peeling strength) of aluminum busbar 2 in FIG. 7B is measured. Nickel-plated copper terminal 1 is fixed by a vice, and an unwelded spot of aluminum busbar 2 is pulled upward at a constant speed by a clamp attached to a force gauge fixed to a measurement stand (tensile tester). Then, a display value of the force gauge when peeling occurs is set as the tensile strength.

As shown in FIG. 7B, aluminum busbar 2 is disposed on nickel-plated copper terminal 1 such that no gap 9 is formed. Then, third solidifying portion 4 having the shallow depth is formed at the leftmost position, and second solidifying portion 5 having the deep depth is formed at the next position. Further, third solidifying portion 4 having the shallow depth is formed at the next position thereof. In this manner, third solidifying portions 4 and second solidifying portions 5 are alternately formed. In this case, in order to form third solidifying portion 4 having the shallow depth, the output of first laser beam 6c is 1,600 W, and the scanning speed of the laser beam is 800 mm/s. The output of second laser beam 6d for forming second solidifying portion 5 having the deep depth is the same as the output of first laser beam 6c and is 1,600 W, and the scanning speed is 700 mm/s, 600 mm/s, 500 mm/s, 400 mm/s, 300 mm/s, 200 mm/s, or 100 mm/s. Subsequently, as shown in FIG. 7C, aluminum busbar 2 is disposed on nickel-plated copper terminal 1 such that gap 9 is formed to have the size of 0.1 mm, and then the same welding is performed.

In this case, a relationship between the laser scanning speed, the depth (that is, a length), and the tensile strength is shown in FIG. 2.

TABLE 2

| Scanning speed for solidifying portion having deep depth | Without gap | | | | | Gap having size of 0.1 mm | | | | |
|---|---|---|---|---|---|---|---|---|---|---|
| | Depth of solidifying portion having shallow depth | Depth of solidifying portion having deep depth | Ratio of depth | Tensile strength | Determination | Depth of solidifying portion having shallow depth | Depth of solidifying portion having deep depth | Ratio of depth | Tensile strength | Determination |
| 700 mm/s | 25 μm | 34 μm | 1.36 | 47N | x | 0 μm | 8 μm | — | 0N | x |
| 600 mm/s | 38 μm | 57 μm | 1.50 | 205N | o | 10 μm | 35 μm | 3.50 | 186N | o |
| 500 mm/s | 47 μm | 111 μm | 2.36 | 224N | o | 18 μm | 72 μm | 4.00 | 207N | o |
| 400 mm/s | 64 μm | 176 μm | 2.75 | 258N | o | 22 μm | 128 μm | 5.81 | 244N | o |
| 300 mm/s | 73 μm | 224 μm | 3.07 | 263N | o | 25 μm | 177 μm | 7.08 | 273N | o |
| 200 mm/s | 84 μm | 283 μm | 3.37 | 248N | o | 31 μm | 202 μm | 6.51 | 269N | o |
| 100 mm/s | 88 μm | 322 μm | 3.66 | 155N | x | 38 μm | 256 μm | 6.74 | 232N | o |

The depth is set to the deepest depth of depths of the solidifying portions. In a case where the depth is deep, the scanning speed is 100 mm/s, and no gap is formed, the tensile strength is a high strength, and thus no problem arises. However, since discoloration may be found on a back surface of the nickel-plated copper terminal, and a resin component may be disposed on the back surface in an actual battery, X (that is, not allowable) is determined.

In Table 2, in a case where the scanning speed of laser beam 6d for forming second solidifying portion 5 having the deep depth is 700 mm/s, and gap 9 is formed, the depth is shallow to 0 μm to 8 μm, and the bonding strength is low to 0 N. When the scanning speed is lower than 600 mm/s, the depth is 10 μm to 35 μm in a case where the gap is formed, and the depth is 38 μm to 57 μm in a case where no gap is formed. Hence, the depth is deep in both of the cases. In addition, the bonding strengths improve to 205 N and 186 N, respectively. In a case example of having the scanning speed of 600 mm/s and forming of the gap, the depth of the melting portion (corresponding to third solidifying portion 4 after the solidification) having the shallow depth is 10 μm or deeper, and thus it is possible to verify the effect of further improving the bonding strength. On the other hand, it is desirable that the depth of the melting portion (corresponding to third solidifying portion 4 after the solidification) having the shallow depth is 84 μm or shallower, because it is possible to suppress generation of the intermetallic compound such that it is possible to maintain the high bonding strength.

In Example 7, an example of setting of the laser output and the scanning speed is described. However, the values are different from optimal values obtained by a plating thickness, a thickness of a terminal, or a thickness of a busbar and depends on a material of a metal member to be welded, a surface state, a plate thickness, or a total heat capacity including a jig. Therefore, this disclosure is not limited to such values.

Example 8

A relationship between the depth of third solidifying portion 4 having the shallow depth, a distance between the solidifying portions with second solidifying portion 5 having the deep depth, and the bonding strength is studied.

An evaluation method of the welding and the bonding strength is the same as that in Example 4 except for the interval between the tacks. The same welding is performed at intervals of tracks of 0.050 mm, 0.075 mm, 0.100 mm, and an interval to 0.300 mm by increasing the interval by 0.025 mm. The distance between the solidifying portions is set to the shortest distance between the solidifying portions.

In this case, a relationship between the intervals between the tracks, the shortest distance between the solidifying portions, and the tensile strength is shown in FIG. 3.

TABLE 3

| | Without gap | | | | Gap having size of 0.1 mm | | | |
|---|---|---|---|---|---|---|---|---|
| Interval between tracks | Shortest distance between solidifying portions | | Tensile strength | Determination | Shortest distance between solidifying portions | | Tensile strength | Determination |
| 0.050 mm | 0 μm(contact) | | 130N | x | 0 μm(contact) | | 138N | x |
| 0.075 mm | 4 | μm | 146N | x | 10 | μm | 154N | o |
| 0.100 mm | 10 | μm | 153N | o | 13 | μm | 155N | o |
| 0.125 mm | 12 | μm | 169N | o | 13 | μm | 176N | o |
| 0.150 mm | 14 | μm | 192N | o | 18 | μm | 201N | o |
| 0.175 mm | 13 | μm | 222N | o | 27 | μm | 221N | o |
| 0.200 mm | 22 | μm | 208N | o | 42 | μm | 228N | o |
| 0.225 mm | 32 | μm | 217N | o | 66 | μm | 221N | o |
| 0.250 mm | 48 | μm | 224N | o | 82 | μm | 207N | o |
| 0.275 mm | 77 | μm | 222N | o | 111 | μm | 193N | o |
| 0.300 mm | 109 | μm | 187N | o | 152 | μm | 155N | o |

In Table 3, in a case where the interval between the tracks is 0.050 mm or shorter, the shortest distance between the solidifying portions is shorter than 10 μm in both the case where no gap is formed and the case where gap 9 is formed to have the size of 0.1 mm, and the tensile strength is set to a value lower than 150 N. In a case where the interval between the tracks is 0.075 mm or longer, and gap 9 is formed to have the size of 0.1 mm, the shortest distance between the solidifying portions is 10 μm or longer, and the tensile strength is also set to a high value of 150 N or higher. However, in the case where no gap is formed, the tensile strength is set to a value lower than 150 N.

This is considered to be because, when the solidifying portions are close to each other and are formed as one block, the metal region that is melted with the laser during the scanning has a high temperature due to an influence of accumulated heat at a previously scanned spot, and the intermetallic compound is likely to be generated. In addition, this is considered to be because, when a large solidifying portion is formed, a large block of intermetallic compound is formed, and the tensile strength is caused to be lowered.

Hence, second solidifying portion 5 and third solidifying portion 4 may be separated from each other until both portions reach first solidifying portion 3. In particular, when third solidifying portion 4 and second solidifying portion 5 are separated by a distance of 10 μm or longer, heat is dissipated through the heat conduction in a parallel direction to the scanning direction in the unmelted metal region, and it is preferable that it is possible to suppress an increase in temperature in the melting region. On the other hand, it is desirable that the distance between third solidifying portion 4 and second solidifying portion 5 is 111 μm or shorter from a viewpoint of preventing the solidifying portions from being too much separated from each other such that it is not possible to maintain a function as one large welding portion.

In Example 8, an example of setting of the laser output, the scanning speed, and the interval between the tracks is described. However, the values are different from optimal values obtained by a plating thickness, a thickness of a terminal, or a thickness of a busbar and depends on a material of a metal member to be welded, a surface state, a plate thickness, or a total heat capacity including a jig. Therefore, this disclosure is not limited to such values.

In the exemplary embodiments described above, when the first member and the second member are welded to each other, the stable welding with the high welding strength is realized, and thereby it is possible to provide the welding structure and the welding method for metal members with high performance at low costs.

In addition, a technology according to the exemplary embodiments can be applied to welding of aluminum, nickel, iron, copper, stainless steel, or an alloy thereof. Examples of applicable stainless steel include austenitic stainless steel, ferritic stainless steel, martensitic stainless steel, or austenitic-ferritic (two-phase) stainless steel.

Any exemplary embodiments or modification examples of the various exemplary embodiments or modification examples described above can be appropriately combined, and thereby it is possible to achieve the effects of the combined exemplary embodiments or modification examples. In addition, it is possible to combine the exemplary embodiments with each other, to combine the examples with each other, or to combine the exemplary embodiments and the examples with each other, and it is also possible to combine features of different exemplary embodiments or examples with each other.

According to this disclosure, when the first member and the second member are welded to each other, it is possible to provide the welding structure and the welding method for metal members with the high and stable welding strength.

INDUSTRIAL APPLICABILITY

According to this disclosure, in the welding structure and the welding method for metal members, it is possible to perform the dissimilar metal welding between aluminum and nickel plating with high quality at low costs. Therefore, it is possible to provide a battery system at low costs. Further, the welding structure for metal members according to this disclosure can be applied to an automotive battery or a stationary power storage system that requires a high output.

REFERENCE MARKS IN THE DRAWINGS

1 COPPER TERMINAL
2 ALUMINUM BUSBAR
3 FIRST SOLIDIFYING PORTION
4 THIRD SOLIDIFYING PORTION
5 SECOND SOLIDIFYING PORTION
6a, 6b, 6c, 6d LAYER BEAM
7 TRACK
8 TRACK
9 GAP
10 TRACK
11 TRACK
21 FIRST MEMBER
22 SECOND MEMBER
23 LOW-HARDNESS LAYER
24 HIGH-HARDNESS LAYER
25 FIRST LAYER
26 SECOND LAYER

The invention claimed is:

1. A welding structure for a metal member, comprising:
a first member that has a first surface and a second surface on an opposite side of the first surface;
a second member that is attached to the second surface of the first member and made of a material capable of forming an alloy with a material of the first member;
a first solidifying portion that is present from the first surface to the second surface of the first member;
a second solidifying portion that has a first end, which is present in the second member, and a second end, which is connected to the first solidifying portion; and
a third solidifying portion that has a first end, which is present in the second member, and a second end, which is connected to the first solidifying portion,
wherein the third solidifying portion is shorter than the second solidifying portion, and
wherein the second solidifying portion and the third solidifying portion are separated from each other by a non-solidifying portion of the second member in the second member, and the non-solidifying portion is in contact with the first solidifying portion.

2. The welding structure of claim 1,
wherein the second solidifying portion is one of a plurality of second solidifying portions,
wherein the third solidifying portion is one of a plurality of third solidifying portions, and
wherein the second solidifying portions and the third solidifying portions are alternately disposed with non-solidifying portions of the second member interposed therebetween.

3. The welding structure of claim 1,
wherein a distance between the second solidifying portion and the third solidifying portion is 10 µm or longer and 111 µm or shorter.

4. The welding structure of claim 1,
wherein a length of the third solidifying portion in the second member is 10 µm or longer and 84 µm or shorter.

5. The welding structure of claim 1,
wherein the first member is made of aluminum, nickel, iron, copper, stainless steel, or an alloy thereof, and
wherein the second member is made of aluminum, nickel, iron, copper, stainless steel, or an alloy thereof.

6. The welding structure of claim 5,
wherein the first member is a metal member containing aluminum, and
wherein the second member is a metal member containing copper.

7. The welding structure of claim 1,
wherein the third solidifying portion has a larger amount of an intermetallic compound of the first member and the second member than the second solidifying portion has.

8. A welding method between a first member and a second member, wherein the first member has a first surface and a second surface on an opposite side of the first surface, and the second member is welded to the second surface of the first member,
the method comprising:
first scanning of performing scanning with a first laser beam along a first track; and
second scanning of performing scanning with a second laser beam with a higher output or at a lower speed than the first laser beam, along a second track different from the first track,
wherein the first scanning and the second scanning are alternately performed at least once,
wherein the first scanning and the second scanning cause metal of the first member to be melted from the first surface to the second surface of the first member and then solidified such that a first solidifying portion is formed, wherein, when the first solidifying portion is formed, the first scanning causes metal of the second member to be melted and then solidified such that a third solidifying portion is formed to have a first end, which is present in the second member, and a second end, which is connected to the first solidifying portion, wherein, when the first solidifying portion is formed, the second scanning causes metal of the second member to be melted and then solidified such that a second solidifying portion is formed to have a first end, which is present in the second member, and a second end, which is connected to the first solidifying portion, and wherein, when the second scanning is performed following the first scanning, the second scanning is performed with the second laser beam along the second track moved by a distance at which melting portions of the second member by the first scanning are separable from each other.

9. The welding method of claim 8,
wherein the third solidifying portion is shorter than the second solidifying portion.

10. The welding method of claim 8, wherein, when the second scanning is performed following the first scanning, the second scanning is performed such that a non-solidifying portion of the second member, which is in contact with the first solidifying portion, remains in the second member to separate the second solidifying portion and the third solidifying portion.

* * * * *